United States Patent
Rentmeister et al.

(10) Patent No.: US 9,857,232 B2
(45) Date of Patent: Jan. 2, 2018

(54) DEVICE FOR NON-CONTACT TEMPERATURE MEASUREMENT AND TEMPERATURE MEASUREMENT METHOD

(71) Applicant: Testo AG, Lenzkirch (DE)

(72) Inventors: Sara Rentmeister, Buchenbach (DE); Jan-Friso Evers-Senne, Titisee-Neustadt (DE)

(73) Assignee: TESTO AG, Lenzkirch (DE)

( * ) Notice: Subject to any disclaimer, the term of this patent is extended or adjusted under 35 U.S.C. 154(b) by 772 days.

(21) Appl. No.: 14/380,117

(22) PCT Filed: Feb. 20, 2013

(86) PCT No.: PCT/EP2013/000484
§ 371 (c)(1),
(2) Date: Dec. 3, 2014

(87) PCT Pub. No.: WO2013/124056
PCT Pub. Date: Aug. 29, 2013

(65) Prior Publication Data
US 2015/0110152 A1 Apr. 23, 2015

(30) Foreign Application Priority Data

Feb. 21, 2012 (DE) .................. 10 2012 003 255

(51) Int. Cl.
*G01J 5/00* (2006.01)
*G01J 5/08* (2006.01)
(Continued)

(52) U.S. Cl.
CPC ............ *G01J 5/505* (2013.01); *G01J 5/0275* (2013.01); *G01J 2005/0048* (2013.01); *G01J 2005/0077* (2013.01)

(58) Field of Classification Search
CPC ................. G01J 5/00; G01J 2005/0077; G01J 2005/0048; G01J 5/089; G01J 2005/0085;
(Continued)

(56) References Cited

U.S. PATENT DOCUMENTS 4,498,765 A * 2/1985 Herve .................. G01J 5/58
356/43
5,003,166 A 3/1991 Girol
(Continued)

FOREIGN PATENT DOCUMENTS

DE 10133761 1/2003
DE 102004027341 12/2005
(Continued)

OTHER PUBLICATIONS

Tasi, Yi-Min, et al., "Block-Based Vanishing Line and Vanishing Point Detection for 3D Scene Reconstruction", Intelligent Signal Processing and Communications, 2006, ISPACS International Syumposium on, IEEE, PI, Dec. 1, 2006, pp. 586-589.

*Primary Examiner* — Gail Kaplan Verbitsky
(74) *Attorney, Agent, or Firm* — Volpe and Koenig, P.C.

(57) ABSTRACT

In a device (1) for non-contact temperature measurement, it is proposed that an angle measuring device (5) is designed such that an emission angle (6) of the IR radiation detected with a detector (2) for temperature measurement can be measured on the measuring region (9) of a measuring object (3) emitting the IR radiation.

24 Claims, 8 Drawing Sheets

(51) Int. Cl.
*G01J 5/50* (2006.01)
*G01J 5/02* (2006.01)

(58) Field of Classification Search
CPC ...... G01J 2005/586; G01J 5/0003; G01J 5/08; G01J 5/0825; H01L 27/14649; H04N 5/3655; G01K 13/00; G01K 11/125; G01K 2213/00
USPC .................. 374/121, 128; 702/99, 130, 135; 250/338.1
See application file for complete search history.

(56) References Cited

U.S. PATENT DOCUMENTS

| | | | | |
|---|---|---|---|---|
| 5,008,543 | A * | 4/1991 | Bertrand | G01C 3/18 250/342 |
| 5,011,295 | A * | 4/1991 | Krishnan | G01J 4/04 374/124 |
| 5,436,443 | A * | 7/1995 | Abtahi | G01J 5/58 250/225 |
| 6,115,128 | A | 9/2000 | Vann | |
| 6,950,546 | B2 * | 9/2005 | Chang | G01N 21/952 348/E7.085 |
| 7,744,274 | B1 * | 6/2010 | Grek | G01J 5/0003 374/124 |
| 8,306,308 | B2 * | 11/2012 | Choi | G01N 21/952 356/601 |
| 8,498,836 | B2 * | 7/2013 | Carlson | G01J 5/02 374/137 |
| 8,696,197 | B2 * | 4/2014 | Timans | G01J 5/0003 250/339.11 |
| 8,944,679 | B2 * | 2/2015 | Ishii | G01K 11/30 250/381 |
| 9,516,243 | B2 * | 12/2016 | Rothenfusser | G01J 5/0003 |
| 2002/0080357 | A1 * | 6/2002 | Dana | G01N 21/4738 356/445 |
| 2005/0190285 | A1 * | 9/2005 | Ito | H04N 5/23212 348/345 |
| 2006/0000812 | A1 * | 1/2006 | Weber | B29C 65/1654 219/121.61 |
| 2008/0174702 | A1 * | 7/2008 | Wu | H04N 21/42222 348/734 |
| 2009/0218478 | A1 * | 9/2009 | Kim | G01S 7/495 250/221 |
| 2010/0014555 | A1 * | 1/2010 | Twerdochlib | G01J 5/0003 374/121 |
| 2010/0131225 | A1 | 5/2010 | Carlson | |
| 2010/0292950 | A1 * | 11/2010 | Iuchi | G01J 5/0003 702/134 |
| 2011/0311104 | A1 | 12/2011 | Sinha et al. | |
| 2012/0155509 | A1 * | 6/2012 | Ishii | G01K 11/30 374/159 |
| 2015/0115178 | A1 * | 4/2015 | Jean | G06T 7/136 250/491.1 |
| 2016/0157732 | A1 * | 6/2016 | Tanaka | G01J 5/0875 600/474 |
| 2017/0074848 | A1 * | 3/2017 | Rolff | B65D 79/02 |

FOREIGN PATENT DOCUMENTS

| | | |
|---|---|---|
| EP | 1033556 | 9/2000 |
| EP | 1582846 | 10/2005 |
| WO | 2011075124 | 6/2011 |

\* cited by examiner

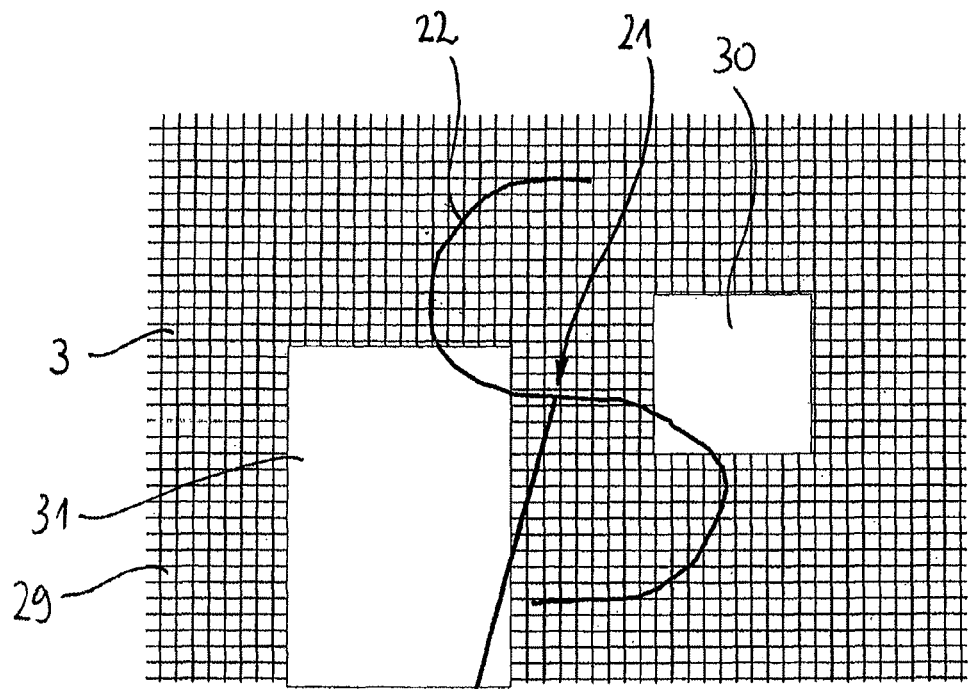
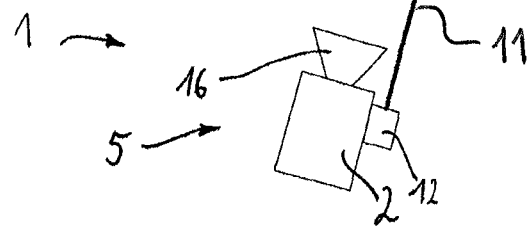
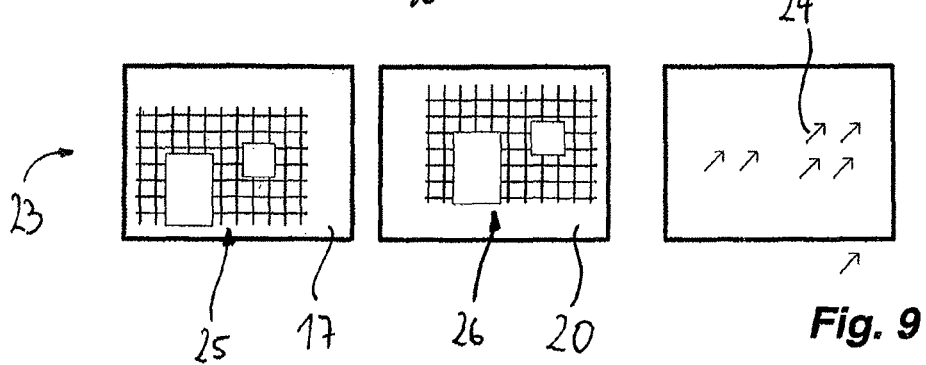
Fig. 8
Fig. 9

DEVICE FOR NON-CONTACT TEMPERATURE MEASUREMENT AND TEMPERATURE MEASUREMENT METHOD

BACKGROUND

The invention relates to a device for non-contact temperature measurement, comprising a detector for detecting IR radiation from a measurement object.

The invention furthermore relates to a temperature measurement method in which IR radiation from a measurement object is detected by means of a detector of a device for non-contact temperature measurement.

The devices mentioned are known as pyrometers or as thermal imaging cameras, for example, which can be used to perform the temperature measurement method described.

Non-contact temperature measurement requires extensive experience, since possible error sources that exist include a multiplicity of influencing variables which cannot be detected or monitored directly by the human senses.

US 2010/0131225 A1 discloses a system and a method for identifying thermographic anomalies, wherein an image recorded at a later point in time is subjected to motion compensation in order to carry out a comparison with a previously recorded image.

EP 1 033 556 A1, EP 1 582 846 A2, U.S. Pat. Nos. 5,003,166 A, 6,115,128 A and DE 10 2004 027 341 A1 disclose various distance and/or angle measuring devices.

The invention addresses the problem of simplifying the handling of a device for non-contact temperature measurement in a temperature measurement method.

SUMMARY

For the solution, according to the invention, a device of the type mentioned in the introduction is provided with one or more features of the invention. In particular, according to the invention it is thus proposed that an angle measuring unit is implemented, by means of which an emission angle of the detected IR radiation can be measured on a measurement region of the measurement object. What is advantageous in this case is that, in a simple manner, it is possible to take account of the fact that the measured radiation power of an object is dependent on—besides the temperature of the object and other parameters—the emission angle, that is to say the viewing angle with respect to the object. Consequently, the user is provided with a simple aid for documenting, monitoring, correcting and/or compensating for the measurement situation currently prevailing. It is particularly expedient if the angle measurement unit has an output unit, in particular for outputting and/or providing (for further processing) the calculated emission angle.

By way of example, it can be provided that the emission angle is given by the angle between a surface normal of a measurement region on the measurement object, on the one hand, and a recording direction or an IR-optical axis of the device, on the other hand. What is advantageous in this case is that the emission angle describes the viewing direction from which the device views the measurement region on the measurement object. This again simplifies the compensation or correction of the angle-dependent emission attenuation.

The measurement region on the measurement object is generally given by that surface region from which the IR radiation for the temperature measurement is detected.

The device according to the invention for non-contact temperature measurement can be implemented as a pyrometer, in particular as a single-point pyrometer. According to the invention, however, it can also be provided that the device is designed for filling pixels of a pixel arrangement defined by the detector with IR measurement values. Consequently, the device can create thermal images which reproduce a two-dimensional temperature distribution on the measurement object. This is particularly expedient in the case of the temperature measurement of relatively large areas, since in the case of these areas there is the problem that the areas have an apparent temperature profile, even though the area is at a uniform temperature. This is due to the fact that the emission angle of the individual measurement regions varies with the position of the respective measurement region in relation to the device, such that the radiation power captured by the device likewise varies.

Particularly for spatially resolving measurements in which two-dimensional temperature distributions are created, in one configuration of the invention it can be provided that for a plurality of groups of pixels or a plurality of pixels, an emission angle between a surface normal of an associated measurement region on the measurement object and a recording direction can be measured in each case by means of the angle measuring unit. In this case, the recording direction can be given, for example, by an IR-optical axis of the thermal imaging camera or by the connecting line between the thermal imaging camera and the respectively associated measurement region. What is advantageous in this case is that the information about an emission angle is likewise available and processable in a spatially resolving manner.

It is particularly expedient if the angle measuring unit according to the invention is implemented and designed for non-contact angle measurement.

By way of example, in one configuration of the invention it can be provided that distances to at least two points spaced apart from one another on the measurement object can be measured by means of the angle measuring unit. It can also be provided that a slope or an inclination of a surface of the measurement object as a result of perspective distortion or deformation of a projected pattern can be measured by means of the angle measuring unit. The emission angle can be derived from the measured slope by means of simple geometrical equations. Preferably, distances between the device or a part thereof and the respective measurement regions are measured by means of the angle measuring unit.

The emission angle can thus be deduced from said distances in a simple manner. It is particularly expedient if distances to at least three points spaced apart from one another on the measurement object can be measured by means of the angle measuring unit. In this case, the emission angle can even be measured as a solid angle, that is to say by the indication of a multi-component angle indication.

In one configuration of the invention it can be provided that the angle measuring unit is designed for distance measurement with at least one deflectable measurement beam. What is advantageous in this case is that the measurement beam can be directed onto different points on the measurement object, such that distances to different points on the measurement object can be measured. Subsequently, by means of known geometrical equations, the emission angle sought can be determined from said distances and is determined in this way.

Alternatively, it can be provided that the angle measuring unit is designed for distance measurement with at least two measurement beams spaced apart from one another. In this case, the measurement beams are spaced apart from one another at least at the impingement point on the measurement object. What is advantageous in this case is that the distances to the points spaced apart from one another on the measurement object can thus be measured simultaneously, such that the angle measurement can be carried out more rapidly overall. It is particularly expedient if at least three measurement beams spaced apart from one another are designed to measure a solid angle.

In this case, the distance measurement can be designed and carried out by time-of-flight measurement, phase measurement or in some other way. Light beams, UV beams, IR beams, ultrasonic waves, radar waves or other wave or radiation phenomena can be used as the measurement beams. In this case, corresponding measurement radiation generators are implemented on the angle measuring unit.

In one configuration of the invention, it is provided that the angle measuring unit has a recording device, which preferably records in an infrared and/or visible spectral range and by means of which a geometrical shape projected onto the measurement object or described by the measurement object can be detected. What is advantageous in this case is that information about the position of the measurement object in relation to the recording device and/or to the device according to the invention overall can be obtained without distance measurement. In this case, the invention makes use of the fact that the (apparent) geometrical shape of a measurement object in a recorded image changes with the position of the measurement object perspectively according to laws known per se. It is also possible to utilize other spectral ranges, including acoustic frequency ranges of other physical interactions for the recording device. By way of example, the user of a thermal imaging camera, the detector of which is part of the device according to the invention, is enabled to determine the viewing angle of an area, that is to say the emission angle, with only one image recording and without additional hardware. If said emission angle is determined separately in a location- or angle-dependent manner for different partial regions of the measurement object, then the radiation measurement can be corrected in a location-dependent manner. This is advantageous particularly in the case of extensive measurement objects, for example solar panels or solar installations. For projecting the pattern, the angle measuring unit can have a pattern projector.

In this case or in one configuration of the invention it can be provided that the angle measuring unit is designed for calculating a position of the measurement object in a three-dimensional space, said position being related to a recording position and/or recording direction of the device by comparing a recorded geometrical shape with an associated geometrical comparison shape stored in the angle measuring unit. It is particularly expedient if the comparison shape is stored in a perspectively undistorted manner and/or in a manner related to a defined recording perspective. This comparison can be carried out for example by means of solving a system of equations describing the projection of the measurement object onto a recording plane. The comparison can also be performed by means of simulating at least one element, preferably a plurality or even all of the elements, from the group of rotations, displacements, expansions and compressions, for the measurement object in relation to the recording device. What is advantageous in this case is that a direct distance measurement can be dispensed with. This is all the more applicable since the result ultimately of interest is an emission angle that can be determined scale-independently. Particularly in the case of solar installations, the size and shape of the solar panels are known and can be stored as the comparison shape.

In one configuration of the invention it is provided that the angle measuring unit is designed for recording a sequence of images from the measurement object in an infrared and/or visible spectral range and measuring a distance information item respectively assigned to the images. Preferably, for this purpose, a measurement beam generator is rigidly connected to the angle measuring unit. What is advantageous in this case is that a single measurement beam generator suffices since the measurement beam can be moved over the measurement object between the recordings of the images of the sequence. The measurement beam generator can be designed for distance measurement by means of a time-of-flight measurement and/or a phase measurement and/or some other distance measuring method.

In one configuration of the invention it is provided that the angle measuring unit is designed for calculating at least one motion vector which describes a correspondence in terms of contents between two images of a recorded sequence of images. What is advantageous in this case is that a movement of a measurement beam generator rigidly connected to the angle measuring unit relative to the measurement object can be detected. Methods for calculating motion vectors with respect to two images are known per se and can advantageously be used here.

In one configuration of the invention it is provided that the angle measuring unit is designed for calculating a distance information item assigned to a partial region of a reference image from a distance information item, for example that which has already been mentioned, assigned to an image of a recorded sequence of images and from a calculated motion vector describing a correspondence in terms of contents between the image and the reference image. What is advantageous in this case is that distance information items of the images of the sequence of images can be entered into the reference image positionally correctly and/or angularly correctly. Consequently, a three-dimensional image of the measurement object can be reconstructed. In this case, in a first approximation stage it can be assumed that the recording device was pivoted only about one pivoting point. In a second, improved approximation stage, additional translations can be compensated for by a process of seeking movements to different extents in the foreground and in the background.

In one configuration of the invention it is provided that the angle measuring unit is designed for approximately or exactly calculating a position of the measurement object in a three-dimensional space, said position being related to a recording position and/or recording direction of the device, from distance information items assigned to partial regions of the measurement object. Surfaces of a measurement object and their position in relation to the angle measuring unit can thus be calculated. Pixel-by-pixel distance information items can thus be obtained. The emission angle sought can be derived from said position by means of known geometrical laws.

In one configuration of the invention it is provided that the angle measuring unit is designed for calculating the emission angle from a position of the measurement object in a three-dimensional space, said position being related to a recording position and/or recording direction of the device. What is advantageous in this case is that a corruption of a measurement of an emitted intensity can be corrected automatically.

To put it more precisely, a point cloud in a three-dimensional space can be constructed from the distance information items obtained, using the motion vectors. Best-fit planes, in particular best-fit planes, which describe the measurement object, can be placed into said point cloud.

In one configuration of the invention it is provided that the angle measuring unit is designed for identifying lines running parallel on the measurement object in an image recorded from the measurement object in an infrared and/or visible spectral range. What is advantageous in this case is that vanishing points of lines which run parallel can be calculated. In this case, the vanishing points result as points of intersection of lines identified in the recorded image as running parallel on the measurement object within or outside the recorded image. The position of the vanishing points in the recorded image can advantageously be utilized for a calculation of the spatial position of the measurement object in the three-dimensional space. This configuration can advantageously be used when measuring the functionality of solar panels, since, by virtue of the often rectangular aluminum frames or frames composed of some other material of the solar panels, there is an arrangement of parallel lines on the measurement object.

In one configuration of the invention it is provided that the angle measuring unit is designed for calculating the emission angle from a position of at least one vanishing point in an image recorded in an infrared and/or visible spectral range. What is advantageous in this case is that a distance measurement can be dispensed with. What is furthermore advantageous is that the geometrical shape of a measurement object or of a pattern projected onto the measurement object need not be known. In particular, reference scales can be dispensed with since the emission angle is scale-independent.

In an application in which the detector is an infrared (IR) detector of a thermal imaging camera, the invention affords the advantage that the reflection of sky insolation can be computationally extracted from the recorded thermal image (and the absolute temperature information contained therein). Furthermore, with knowledge of the emission angle, it is possible to correct the emission of the measurement object by the emission angle (viewing angle). These corrections can be carried out for a partial region or all the pixels of the recorded (thermal) image.

In one configuration of the invention it can be provided that an evaluation unit is implemented, which is designed for generating a warning signal if the emission angle measured by means of the angle measuring unit lies outside a predefined range. The evaluation unit thus has checking means which can automatically identify whether the measured emission angle lies in the predefined range or outside the predefined range. What is advantageous in this case is that the recommendation for thermographic recordings, to be positioned at from 90° with respect to the object to approximately +/−30° with respect to the object, in order to avoid incorrect interpretations, can be monitored in a simple manner. The evaluation unit can be implemented, for example, such that a warning signal is generated if the angle between the recording direction and the surface normal at the measurement region exceeds 60°, preferably 45° or particularly preferably 30°.

Alternatively or additionally, the evaluation unit can be implemented such that a warning signal is generated if the angle between the recording direction and the surface normal of the measurement spot is less than 15°, preferably less than 10° or particularly preferably less than 5°. What is advantageous in this case is that measurement situations in which a user records his/her own reflected image can likewise be identified and avoided or corrected.

In one configuration of the invention it can be provided that an evaluation unit is implemented, which is designed for correcting the IR measurement values by a perspective and/or radiation-physical attenuation of the IR radiation detected by the device, said attenuation being governed by the at least one measured emission angle. What is advantageous in this case is that unfavorable measurement situations which are unavoidable in the case of measurement objects that are difficult to access, for example, can be evaluated by means of the device according to the invention. Such measurement situations can arise for example in the case of measurement objects arranged at a great height, for example in the case of solar panels on roofs. This is because the correction makes it possible to be able to carry out temperature measurements that are useable even in the case of these unfavorable measurement situations. By way of example, the evaluation unit can be implemented and designed such that the correction is effected by taking account of Lambert's cosine law for the radiant intensity.

In one configuration of the invention it can be provided that an output unit is designed for outputting corrected measurement values. Consequently, the results of the non-contact temperature measurement can be output directly in corrected form. By way of example, the corrected IR measurement values can be output as a corrected thermal image with corrected IR measurement values.

It is particularly expedient if the device is implemented as a pyrometer, in particular single-point pyrometer, or a thermal imaging camera.

For solving the abovementioned problem, a method is provided according to the invention. In particular, therefore, in a temperature measurement method of the type mentioned in the introduction it is provided that an emission angle of the detected IR radiation is measured on a measurement region of the measurement object by means of an angle measuring unit of the device. What is advantageous in this case is that the corrupting influence of a slope of the examined measurement region on the measurement object in relation to the measurement direction can automatically be detected and processed, for example corrected.

In the temperature measurement method according to the invention it can be provided that an angle between a surface normal of a measurement region on the measurement object, on the one hand, and a recording direction or an IR-optical axis of the device, on the other hand, is measured for the purpose of measuring the emission angle. It has been found that said angle In one configuration of the invention it can be provided that an output unit is designed for outputting corrected measurement values. Consequently, the results of the non-contact temperature measurement can be output directly in corrected form. By way of example, the corrected IR measurement values can be output as a corrected thermal image with corrected IR measurement values.

It is particularly expedient if the device is implemented as a pyrometer, in particular single-point pyrometer, or a thermal imaging camera.

For solving the abovementioned problem, according to the invention, in a temperature measurement method of the type mentioned in the introduction it is provided that an emission angle of the detected IR radiation is measured on a measurement region of the measurement object by means of an angle measuring unit of the device. What is advantageous in this case is that the corrupting influence of a slope of the examined measurement region on the measurement object in relation to the measurement direction can automatically be detected and processed, for example corrected.

In the temperature measurement method according to the invention it can be provided that an angle between a surface normal of a measurement region on the measurement object, on the one hand, and a recording direction or an IR-optical axis of the device, on the other hand, is measured for the purpose of measuring the emission angle. It has been found that said angle can be measured particularly simply since the orientation of the surface normal can be derived from the orientation of the measurement region in space.

In one configuration of the invention it can be provided that an individual temperature value is measured by means of the temperature measurement method by means of a pyrometer.

In a further configuration of the invention it can be provided that a pixel arrangement defined by the detector has pixels, and that the pixels are filled with the IR measurement values of the IR radiation. What is advantageous in this case is that two-dimensional temperature distributions can be created from the measurement object.

In one configuration of the invention it can be provided that a single emission angle, for example an average emission angle, is measured for an areal measurement region.

Alternatively, it can be provided that, for a plurality of groups of pixels or a plurality of pixels, an emission angle is measured in each case by means of the angle measurement unit. By way of example, said emission angle can be given by an angle between a surface normal of an associated measurement region on the measurement object and a recording direction, which can be pixel-related. The recording direction is preferably given by an IR-optical axis of the device or a connecting line between the device and the associated measurement region. What is advantageous in this case is that the emission angle can be detected and processed further in a spatially resolving manner.

In one configuration of the invention it can be provided that distances to at least two, preferably at least three, points spaced apart from one another on the measurement object are measured by means of the angle measuring unit. For this purpose, by way of example, it is possible to use distance sensors which can carry out non-contact distance measurements. By way of example, laser beams or ultrasonic waves or other radiation or wave phenomena can be used.

In this case, it is expedient if at least two distance measurements with respect to the measurement object are carried out with one deflectable measurement beam. What is advantageous in this case is that only one measurement beam generator is necessary, and that the emission angle can be derived from the results of the at least two distance measurements. Preferably, three distance measurements or more, for example four, five, six or more than six distance measurements, are carried out.

Alternatively or additionally, it can be provided that in each case one distance measurement with respect to the measurement object is carried out with at least two measurement beams spaced apart from one another. By way of example, these spaced-apart measurement beams can be formed by one measurement beam being split. It is also possible to provide a plurality of measurement beam generators. What is advantageous in this case is that the distance measurements can be carried out and are carried out simultaneously. This shortens the expenditure of time for determining the emission angle. In this case, it can be provided that a respective measurement beam is directed onto each of the points which are spaced apart from one another and which were selected for the distance measurements on the measurement object.

In one configuration of the invention it is provided that a geometrical shape projected onto the measurement object or described by the measurement object is detected. In this case, the geometrical shape can be given by a structure and/or contour of the measurement object or by a projected pattern. It is particularly expedient if the recording is carried out in an infrared and/or visible spectral range. By way of example, the detector can be utilized for this purpose. What is advantageous in this case is that known algorithms for determining the position or pose of a measurement object in relation to the angle measuring unit can be utilized. The emission angle can be calculated from the position or pose by means of geometrical laws known per se. A non-contact angle measurement of the emission angle can thus be carried out.

In this case or in one configuration of the invention it can be provided that a position of the measurement object in a three-dimensional space, said position being related to a recording position and/or recording direction of the device, is calculated automatically by the comparison of a recorded geometrical shape with an associated geometrical comparison shape stored in the angle measuring unit. What is advantageous in this case is that information about the orientation of the measurement object or of a part thereof can be obtained automatically. The comparison shape is preferably stored in a perspectively undistorted manner, in order to provide a reference for comparison in a simple manner.

In one configuration of the invention of independent significance it is provided that of a sequence of images from the measurement object is recorded in an infrared and/or visible spectral range and a distance information item respectively assigned to the images is measured. Preferably, the distance information item is assigned to a partial region related to a recording direction of the device. This relation can be given, for example, by an image center of the image or the position of an optical axis in the image. This assignment can be given, for example, by an impingement point of the recording direction on the measurement object. In this case, it is particularly expedient if the angle measuring unit and/or the device are/is moved, for example pivoted and/or displaced, relative to the measurement object during the recording of the sequence or between two individual recordings of the sequence in such a way that the recording direction of the angle measuring unit and/or of said device grazes over the measurement object. This method step can be performed as the first step in a method for calculating a three-dimensional image with respect to a measurement object.

In one configuration of the invention it can be provided that at least one motion vector which describes a correspondence in terms of contents between two images of a recorded sequence of images is calculated automatically. A motion vector field of motion vectors is preferably calculated. What is advantageous in this case is that measurement results or numerical values assigned to the individual images, for example the respectively assigned distance information item, can be converted from one image to another image of the sequence, for example a reference image, in particular by means of a transformation specification derived from the at least one motion vector. This method step can be performed as the second step in a method for calculating a three-dimensional image with respect to a measurement object.

In one configuration of the invention it can be provided that a distance information item assigned to a partial region of a reference image is calculated automatically from a distance information item assigned to an image of a recoded sequence of images, in particular the distance information item already described, and from a calculated motion vector describing a correspondence in terms of contents between the image and the reference image. A selected image, for example the reference image, can thus be enriched with distance information items from the other images. A three-dimensional image with depth information can thus be reconstructed. Preferably, the position of the partial region is given by the motion vector respectively used. This method step can be performed as the third step in a method for calculating a three-dimensional image with respect to a measurement object.

In one configuration of the invention it is provided that a position of the measurement object in a three-dimensional space, said position being related to a recording position and/or recording direction of the device, is approximately or exactly calculated automatically from distance information items assigned to partial regions of the measurement object. This method step can be performed as the fourth step in a method for calculating a three-dimensional image with respect to a measurement object.

In one configuration of the invention it can be provided that the emission angle is calculated automatically from a position of the measurement object in a three-dimensional space, said position being related to a recording position and/or recording direction of the device. This method step can be performed as the fifth step in a method for calculating a three-dimensional image with respect to a measurement object. Alternatively, also from a surface area of a geometrical shape, it is possible to calculate the surface area of an associated comparison shape or it is possible to calculate or reconstruct a three-dimensional image.

In one configuration of the invention it is provided that lines running parallel on the measurement object are identified automatically in an image recorded from the measurement object in an infrared and/or visible spectral range. What is advantageous in this case is that reference lines for determining the orientation of the measurement object can be identified automatically. Distance or size indications in relation to the measurement object can be dispensed with.

In one configuration of the invention it is provided that the emission angle is calculated automatically from a position of at least one vanishing point in an image recorded in an infrared and/or visible spectral range. In this case, geometrical laws of perspective that are known per se can be used in the imaging process and can be implemented in the angle measuring unit. What is advantageous in this case is that a contour or structure of the measurement object need not be known in order to be able to automatically determine the position or orientation of the measurement object in relation to the device.

In one configuration of the invention it can be provided that a warning signal is generated by means of an evaluation unit of the device if the emission angle measured by the angle measuring unit leaves a predefined range. What is advantageous in this case is that the fact of when an unfavorable measurement situation is present can be directly indicated or optically or acoustically signaled to the user. If an unfavorable measurement situation is present, the user can repeat the temperature measurement with a changed recording situation.

In one configuration of the invention it can be provided that a perspective or radiation-physical attenuation of the IR measurement values of the device, said attenuation being governed by the at least one measured emission angle, is corrected by means of an evaluation unit. This can be carried out, for example by Lambert's cosine law for the radiant intensity being taken into account. What is advantageous in this case is that the error influences on account of unfavorable measurement situations can be compensated for or corrected. This is advantageous particularly if the unfavorable measurement situation cannot be avoided, for example because the measurement object is accessible only with difficulty.

In one configuration of the invention it can be provided that a corrected thermal image with corrected IR measurement values or a corrected temperature value is output. What is advantageous in this case is that automatically corrected measurement results for further processing are thus provided for the user.

The invention will now be described in greater detail on the basis of an exemplary embodiment, but is not restricted to this exemplary embodiment. Further exemplary embodiments arise through combination of individual or a plurality of features of the claims among one another and/or with individual or a plurality of features of the exemplary embodiment.

BRIEF DESCRIPTION OF THE DRAWINGS

In the figures:

FIG. 8 shows a schematic illustration for elucidating a further angle measuring unit according to the invention, FIG. 9 shows a schematic illustration of a recorded sequence of images for elucidating the angle measuring unit according to FIG. 8.

DETAILED DESCRIPTION OF THE PREFERRED EMBODIMENTS

Figure 1:
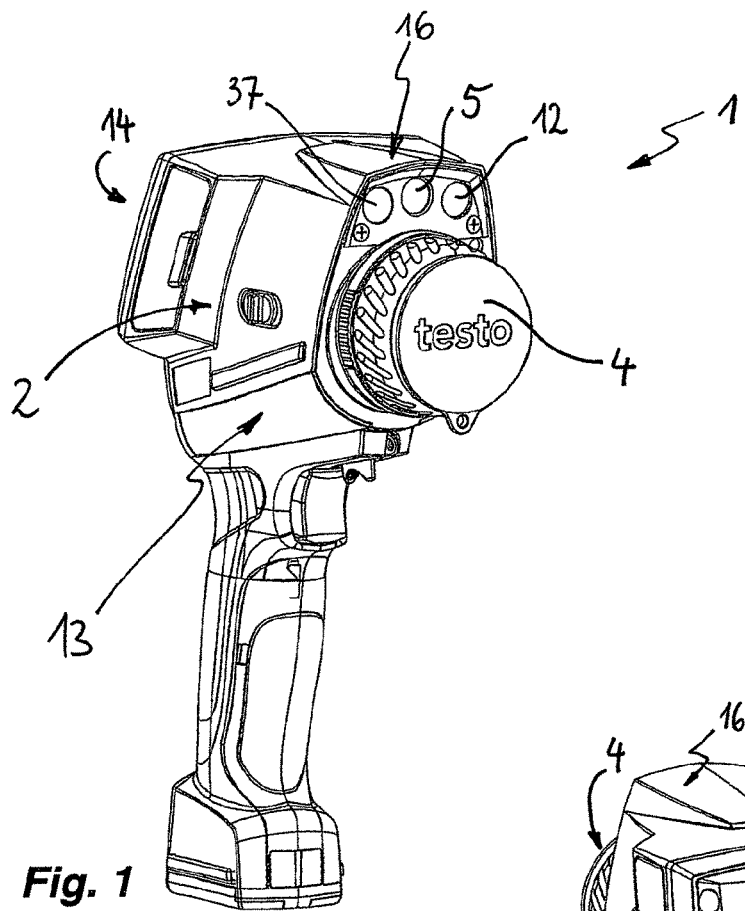
FIG. 1 shows a device according to the invention for non-contact temperature measurement in an oblique view from the front.
Figure 2:
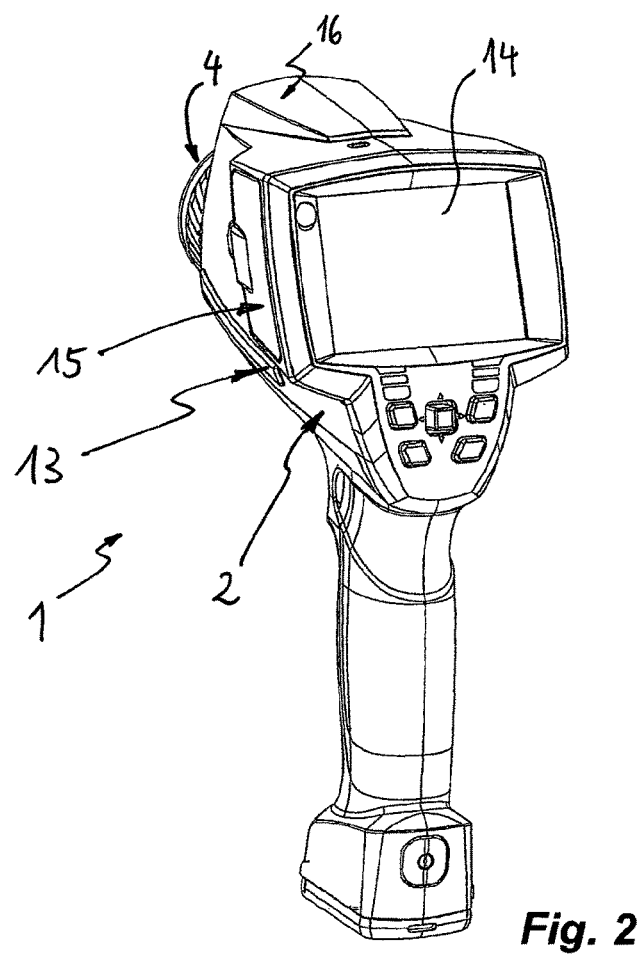
FIG. 2 shows the device in accordance with FIG. 1 in a three-dimensional perspective view from the rear.

FIGS. 1 to 4 are described jointly below. FIGS. 1 and 2 show, in three-dimensional perspective views, a device for non-contact temperature measurement, this device being designated as a whole by 1. A thermal imaging camera is shown for elucidating the principle of the invention; in further exemplary embodiments, the device is implemented as a pyrometer. The device according to the invention in both cases is advantageously implemented as a handheld device in order to enable very simple handling.

The device 1 comprises a detector 2 in its interior, which detector can detect IR radiation from a measurement object 3 in a manner known per se.

For this purpose, the detector 2 is arranged behind an IR optical unit 4, through which the IR radiation enters the interior of the device 1.

The device 1 is thus designed in a manner known per se such that a temperature measurement method can be performed, in which IR radiation from a measurement object 3 is detected by the detector 2 of the device 1 for non-contact temperature measurement.

Figure 3:
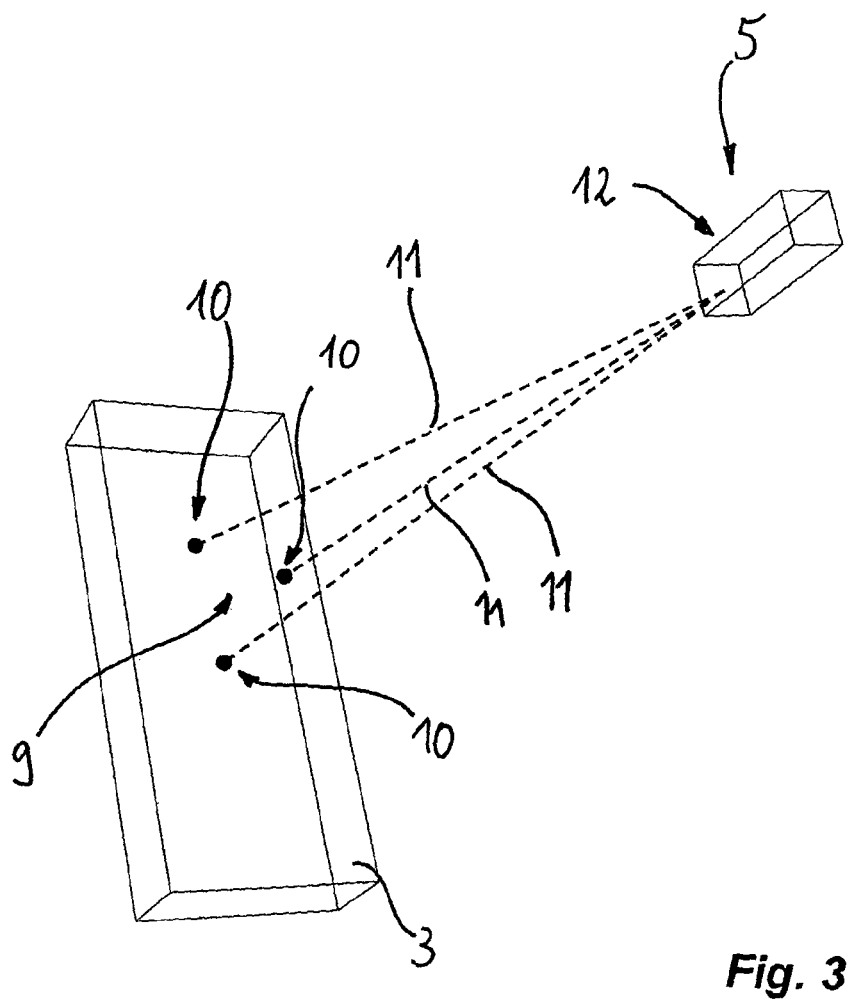
FIG. 3 shows a basic schematic diagram for elucidating the measurement according to the invention of the emission angle.

According to the invention, the device 1 comprises an angle measuring unit 5, which is illustrated schematically in greater detail in FIG. 3 for elucidating the principle according to the invention.

An emission angle 6 formed between the surface normal 7 and the recording direction 8 can be measured by means of the angle measuring unit 5.

In this case, the recording direction 8 is that direction in which the detector 2 of the device 1 lies, as seen from the currently detected measurement region 9 on the surface of the measurement object 3.

The recording direction 8 is thus given by the IR-optical axis of the device 1. If a plurality of measurement regions 9 are examined simultaneously, then the recording direction 8 arises for each measurement region 9 from the line connecting the measurement region 9 to the device 1, more precisely to the detector 2 thereof. For large imaging distances, this connecting line is, to a better and better approximation, parallel to the IR-optical axis of the device 1.

By means of the angle measuring unit 5, the emission angle 6 is then measured by virtue of the fact that the distances from the device 1 or the detector 2 to three points 10 spaced apart from one another can be measured and are measured.

If the distances to fewer than three points 10 are measured, then it is not possible to determine a solid angle, but rather only an angle related to a plane. This can be, for example, a horizontal or vertical inclination angle of the surface given by the region 9 in relation to the IR-optical axis of the device 1. This is already sufficient for many applications.

Three measurement beams re generated for the purpose of distance measurement. The distance measurement is carried out by means of a time-of-flight or phase measurement. The measurement beams can be laser beams or ultrasonic waves or the like. Preference is given to using such measurement beams which allow a distance measurement which can be localized as well as possible.

The measurement beams are generated in a measurement beam generator 12 in the angle measuring unit 5.

In this case, it is possible to provide a common measurement beam generator 12 for all of the measurement beams, wherein the generated beam is split into the measurement beams by means of a beam splitter (not shown in further detail).

Alternatively, a beam deflector can also be provided, by means of which the measurement beams are generated temporally successively by the measurement beam generator 12. In this case, the measurement region 9 is scanned by a measurement beam in the manner of a scanner.

Finally, in a third variant, a plurality of measurement beam generators 12 spaced apart from one another can be provided, such that each measurement beam is generated by a separate measurement beam generator 12. In this case, the distance measurements can be carried out simultaneously.

In any case, the measurement beams are spaced apart from one another at least at the points 10 at which they impinge on the measurement region 9 of the measurement object 3.

The distances to the points 10 are then measured by means of the measurement beams in a manner known per se.

From these distances and the orientations, in particular the included aperture angles or the distances of the measurement beams with respect to one another, the inclination of the measurement region 9 in relation to the viewing direction of the IR optical unit, that is to say the IR-optical axis of the device 1, can subsequently be deduced. The emission angle 6 is calculated therefrom by means of known geometrical equations.

In the device 1, an evaluation unit 13 is furthermore designed and implemented, by means of which an optical or acoustic warning signal can be generated.

In this case, the evaluation unit 13 is designed such that the warning signal is generated if the emission angle 6 measured by the angle measuring unit 5 leaves a predefined range.

In the exemplary embodiment, the evaluation unit 13 is designed such that the warning signal is generated if the emission angle 6 is greater than 60°. In this case, the surface of the measurement region 9 sees so obliquely with respect to the recording direction 8 that a reliable temperature measurement is no longer ensured. In further exemplary embodiments, the warning signal can already be generated if the emission angle exceeds 45° or 30°, or other predefined ranges can be designed.

Figure 4:
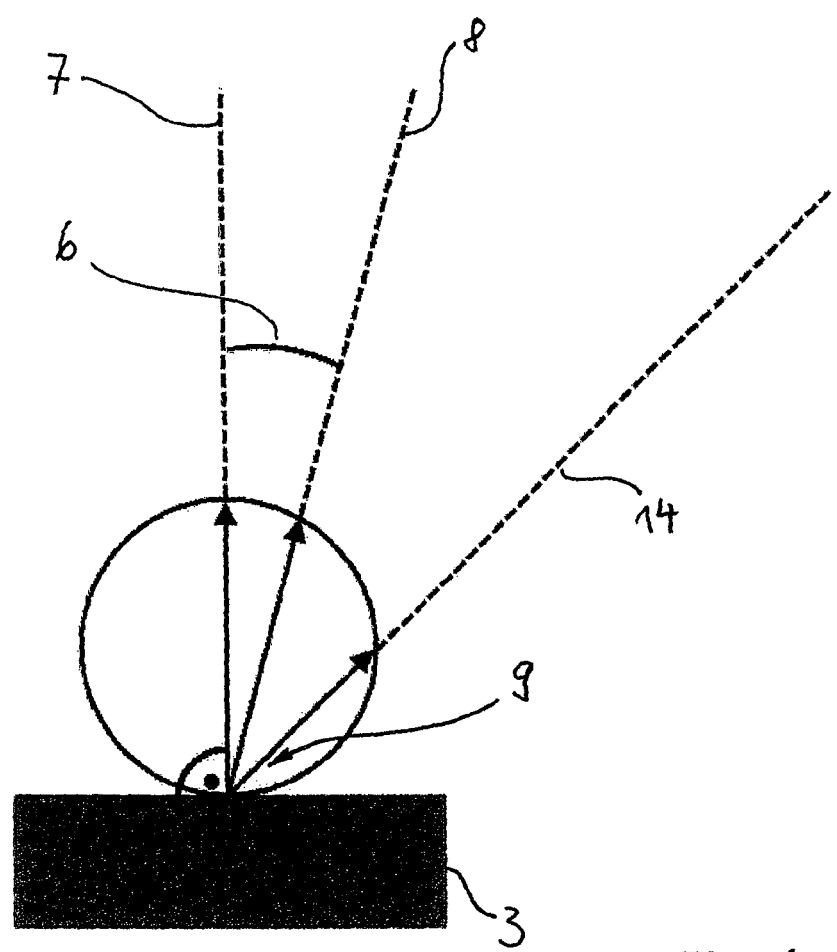
FIG. 4 shows a basic schematic diagram in sectional illustration of elucidating the radiation-physical, angle-dependent emission behavior.

If the emission angle 6 in FIG. 4 is altered by the device 1 and its detector 2 not being arranged in the recording direction 8, but rather in a further recording direction 14, then the radiant intensity which is incident from the measurement region 9 on the detector 2 decreases. According to the equation of Lambert's cosine law, the radiant intensity is proportional to the cosine of the emission angle 6. The proportionality factor is composed multiplicatively of the constant luminance of the area and the surface area of the detected measurement region 9.

The evaluation unit 13 is designed by means of corresponding programming such that the attenuation of the IR radiation detected by the detector 2, said attenuation resulting on account of the non-vanishing emission angle 6, can be corrected and is corrected. For this purpose, Lambert's cosine law for the radiant intensity, as mentioned above, is taken into account by the measured emission angle 6 being correspondingly inserted into the equation mentioned. The correction accordingly provides for calculating from the detected measurement result a corrected measurement result which would arise in the case of an optimum, for example vanishing, emission angle 6. If the device 1 is implemented as a thermal imaging camera, then the measurement result is present as a two-dimensional arrangement of IR measurement values in the form of a thermal image. By contrast, if the device 1 is a pyrometer, then the measurement result is present as an individual IR measurement value.

The evaluation unit 13 correspondingly corrects the IR measurement values of the device 1.

At an output unit, for example a display 14 or a data interface 15, the corrected IR measurement values are then output as a corrected measurement result.

As already mentioned, the exemplary embodiment described represents a thermal imaging camera.

This camera is designed, in a manner known per se, for filling pixels of a pixel arrangement with the measured IR measurement values, wherein the pixel arrangement is defined by the detector 2. The detector 2 can be implemented as an FPA or in a scanner arrangement.

In order to be able to detect the influence of the change in the emission angle 6 during the temperature measurement of extensive areas on a measurement object 3, the emission angles 6 for different measurement regions 9 assigned to different pixels or groups of pixels in the recording situation can be measured and are measured successively or simultaneously by means of the angle measuring unit 5.

For said extensive areas, comprised of a plurality of individual measurement regions 9, without correction according to the invention an apparent temperature profile would arise, attributable to the circumstance that the emission angle 6 for the measurement regions 9 on the measurement object 3 varies as seen over the measurement object 3. The apparent temperature profile therefore occurs even if the measurement regions 9 have a uniform temperature. If the individual measurement regions 9 are considered jointly, then a location-dependent emission angle thus results, the value of which at a point 10 of the measurement object 3 is given by the emission angle of the measurement region 9 which contains the point 10. This location-dependent emission angle is assigned to the pixels of the measurement result recorded from the measurement object 3 in such a way that the emission angle 6 of the associated measurement region 9 on the measurement object 3 is provided for each pixel or each group of pixels.

The angle measuring unit 5 is designed such that said location-dependent emission angle 6 can be determined and is determined by means of corresponding distance measurements or by means of the detection and evaluation of a pattern projected onto the object. A pixel-by-pixel correction of the measurement result is then calculated with this location-dependent emission angle.

The output unit 14 is provided for outputting and/or for providing the calculated emission angle 6.

Figure 5:
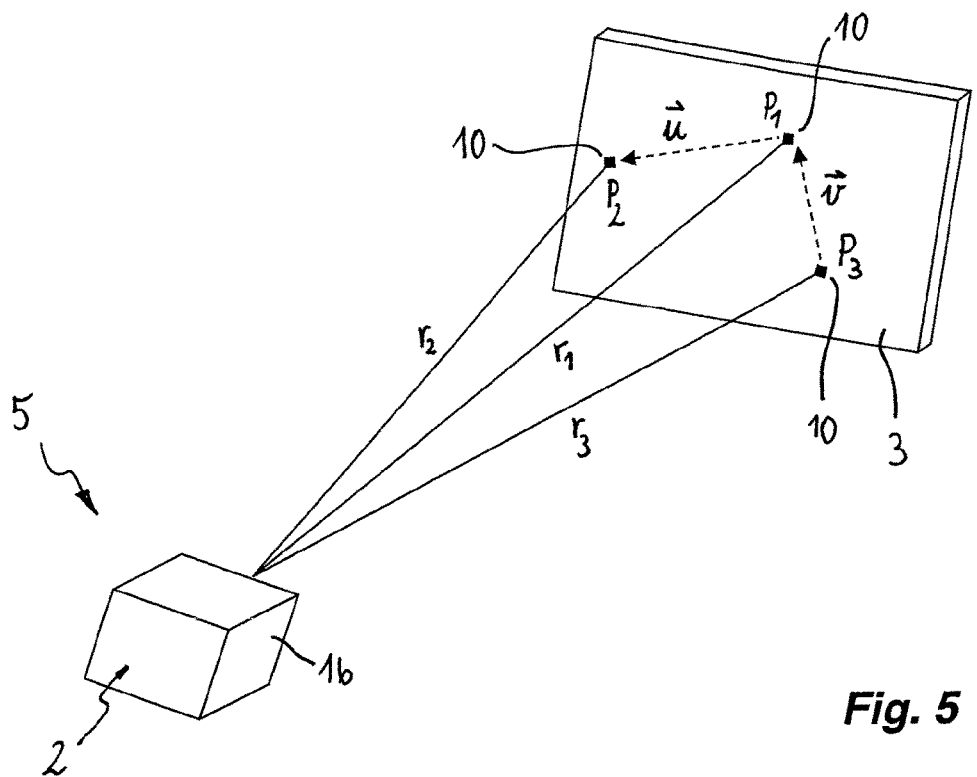
FIG. 5 shows a basic schematic diagram for elucidating the calculation according to the invention of an emission angle.
Figure 6:
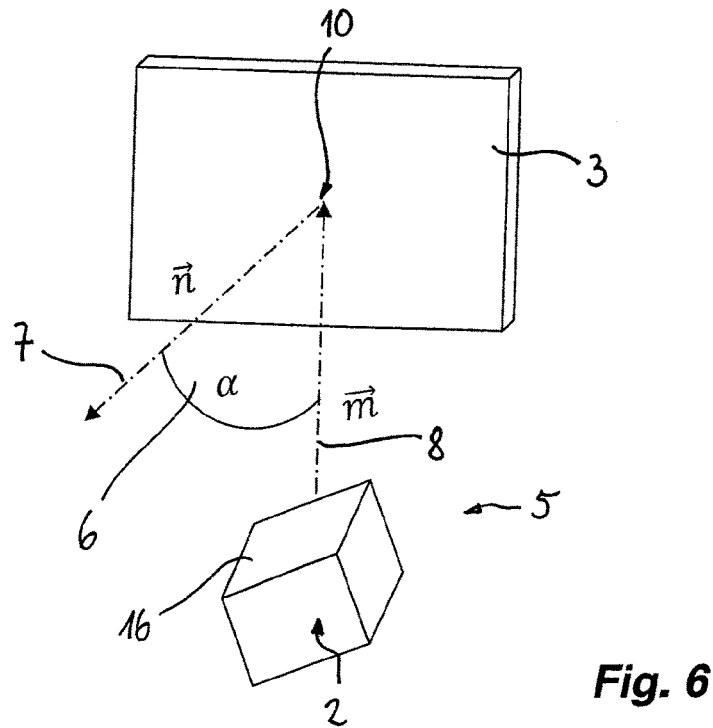
FIG. 6 shows a further basic schematic diagram for elucidating the calculation of the invention of an emission angle.

FIG. 5 and FIG. 6 show the automatic, that is to say computer-implemented, calculation of the emission angle from a position of the position (pose) of the measurement object 3 in a three-dimensional space, said position (pose) being related to a recording position and/or recording direction of the device 1. Component parts which are implemented functionally or structurally identically or similarly to the previous exemplary embodiments are designated by the same reference signs and not described separately. The explanations above are thus correspondingly applicable here.

The distance information items (distances) $r_1$, $r_2$ and $r_3$ between the recording device 16 or generally the angle measuring unit 5 and the points 10, which are individually designated by $P_1$, $P_2$ and $P_3$, are known as a result of distance measurement. The recording device 16 comprises the detector 2; in further exemplary embodiments, the detector 2 is embodied separately.

The angles $\varphi_1$ (Phi 1), $\theta_1$ (Theta 1), $\varphi_2$ (Phi 2), $\theta_2$ (Theta 2), $\varphi_3$ (Phi 3) and $\theta_3$ (Theta 3), at which the distance lines of the distance information items $r_1$, $r_2$ and $r_3$ run in relation to a reference direction, for example the recording direction 8 (cf. FIG. 6), are also known from the recording geometry.

The points $P_1$, $P_2$ and $P_3$ can then be described in a coordinate representation as $$P_n = \begin{pmatrix} x_n \\ y_n \\ z_n \end{pmatrix}$$

where n=1, 2, 3, wherein $$x = r \cdot \sin\theta \cdot \cos\varphi$$

$$y = r \cdot \sin\theta \cdot \sin\varphi$$

$$z = r \cdot \cos\theta$$

The angle measuring unit 5 calculates the coordinates of the points $P_1$, $P_2$ and $P_3$ from the distance information items $r_1$, $r_2$, $r_3$ with recourse to the angle values mentioned.

The points $P_1$, $P_2$ and $P_3$ define a plane which can be described by vectors u and v. The following holds true:

$$\vec{u} = P_2 - P_1$$

$$\vec{v} = P_3 - P_1$$

The angle measuring unit 5 thus calculates the vectors u and v automatically in accordance with this formula.

The vector n describing the surface normal 7 results from the vectorial cross product of the vectors u and v: n=u×v (cf. FIG. 6), if appropriate with additional normalization.

The emission angle α results from the scalar product of the vector n with the vector m describing the recording direction 8 (cf. FIG. 6):

$$\cos\alpha = \vec{m} \cdot \frac{\vec{n}}{|\vec{n}|}$$

The emission angle α can be specified in degrees, radians or some other suitable unit system. The angle measuring unit 5 thus automatically calculates the emission angle 6, α (cf. FIG. 4).

Figure 7:
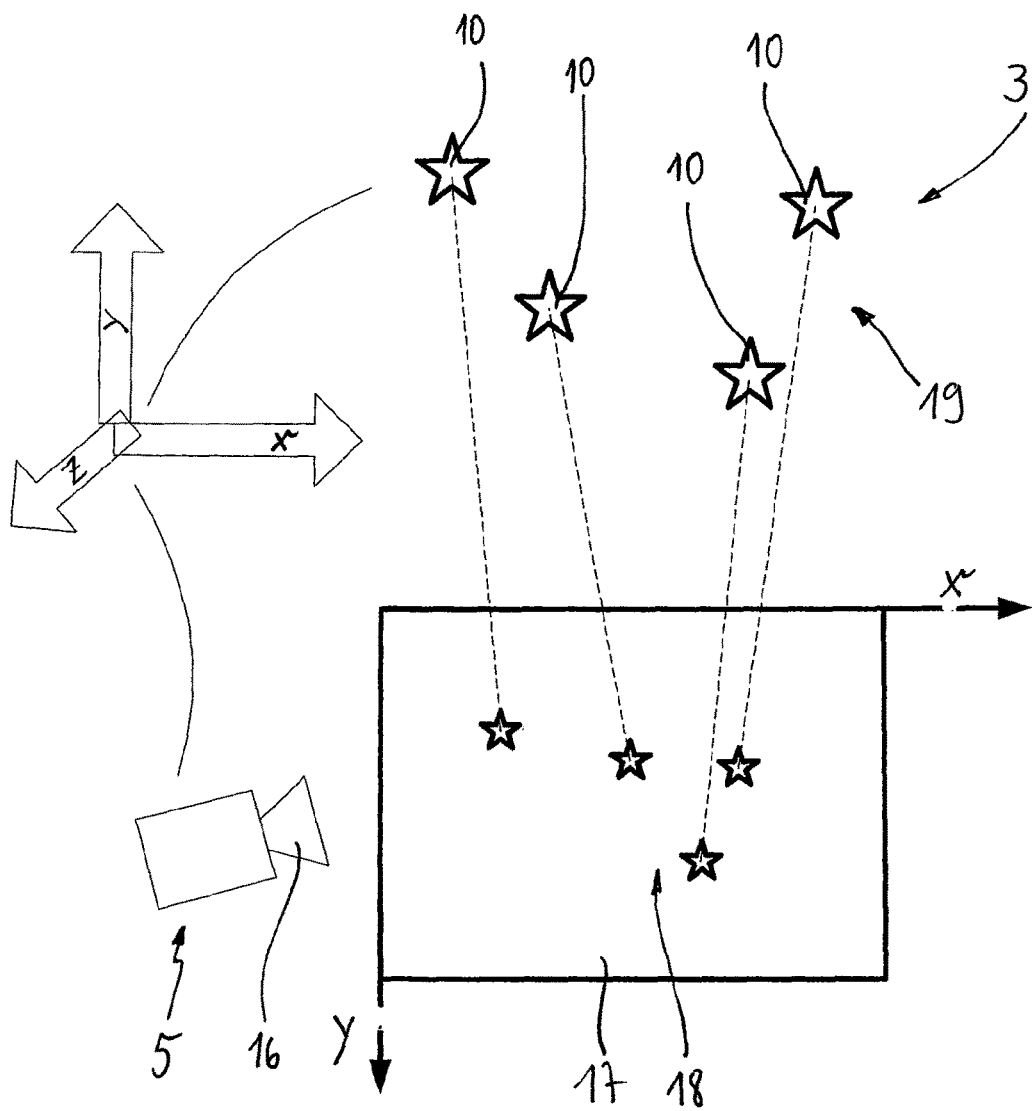
FIG. 7 shows a schematic illustration for elucidating an angle measuring unit according to the invention.

FIG. 7 shows an alternative for determining the position of the measurement object 3 in a three-dimensional space without direct distance measurement.

A two-dimensional image 17 from the measurement object 3 is recorded in the visible spectral range and/or in the infrared spectral range by means of a recording device 16.

In this case, the image 17 contains a geometrical shape 18 representing a projection of significant points 10 of the measurement object 3. In this case, these points 10 may be distinguished by the measurement object 3 itself, for example by the contour thereof, or by a pattern projection. For the purpose of pattern projection, the angle measuring unit 5 can have a pattern projector 37.

An associated geometrical comparison shape 19 is stored in the angle measuring unit 5, with this comparison shape reproducing the actual shape of the measurement object 3 or of a pattern projected onto the measurement object 3 without distortion. With the aid of feature analyses or in some other way, the details of the geometrical shape 18 are associated with the points 10 of the comparison shape 19. This gives rise to a system of equations describing—for an unknown position or camera pose of the comparison shape 19 in the three-dimensional space—the projection of the comparison shape 19 onto the image 17 during the imaging process.

This system of equations is set up according to the pinhole camera model, for example. Lenses present in the beam path can be taken into account in a simple manner by the use of a modified and/or adaptive, for example calibrated, pinhole camera model that simulates the imaging properties of the lens system.

This system of equations is then solved by the angle measuring unit 5 with respect to the coordinates $P_1$, $P_2$, etc. of the points 10. The angle measuring unit 5 subsequently calculates—as described with regard to FIG. 5 and FIG. 6—the emission angle α.

FIG. 8 to serve for elucidating a further exemplary embodiment of the invention. Component parts implemented functionally or structurally identically or similarly to the pervious exemplary embodiments are designated by the same reference signs and not described separately. The explanations above are thus correspondingly applicable here.

A device 1 according to the invention additionally has a measurement beam generator 12, which can generate a measurement beam. By way of example, the measurement beam generator 12 is a laser beam generator.

The measurement beam generator 12 is designed for distance measurement in a manner known per se, for example by means of a time-of-flight measurement and/or a phase measurement of a modulation of the measurement beam.

The measurement beam generator 12 is coupled to the recording device 16 in such a way that a distance information item measured by means of the measurement beam generator 12 is assigned to each recorded image 17, 20. This distance information item in this case describes the distance between the recording device 16 and the measurement object 3, more precisely a partial region 21 on the measurement object at which the measurement beam impinges.

As shown in FIG. 8, the recording device 16 with the device 1 is pivoted in front of the measurement object 3 in such a way that the above-mentioned impingement point of the measurement beam describes a desired line 22 on the measurement object 3.

The sequence 23 of images 17, 20 is recorded during this pivoting process. Each image 17, 20 corresponds to a different recording direction 8, for which reason the image contents 25, 26 of the images 17, 20 are arranged in a manner offset with respect to one another.

The angle measuring unit 5 then calculates the motion vectors 24 describing the displacement of the image contents between the images 17, 20. A motion vector field is present as a result, said motion vector field assigning a motion vector 24 to the significant partial regions 21 or even to all the pixels of the images 17, 20. This calculation is implemented in a manner known per se by the calculation of an optical flow, a thin optical flow (calculation only for parts of interest of the images 17, 20, for example for particularly high-contrast or otherwise suitable image constituents, such as corners, which are distinguished by strong x-gradients and strong y-gradients), according to the KLT tracking method (using KLT features) or in some other suitable way. If the movement between the images 17, 20 is too large, the motion vectors 24 can be calculated for images with reduced resolution in a resolution pyramid.

In FIG. 9, the sequence 23 has only two images 17, 20 by way of example for explaining the invention. In actual fact, a larger number of images are processed. The image 17 is used as a reference image, for example, to which the motion vectors 24 of the images 20 of the sequence 23 are related.

Figure 10:
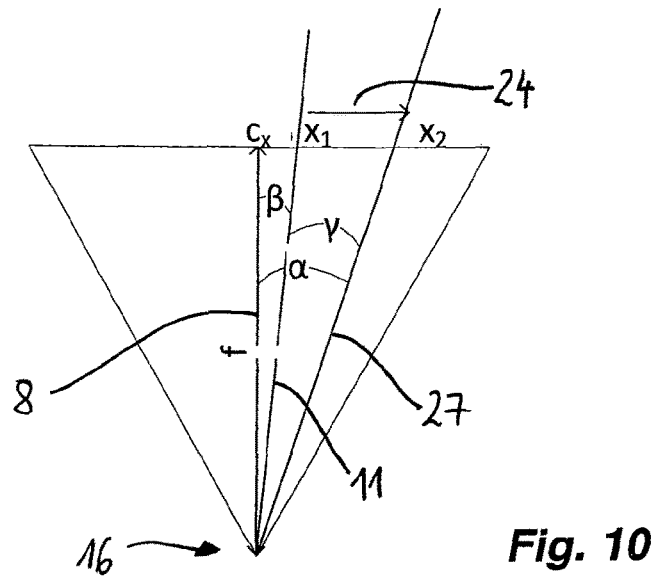
FIG. 10 shows an illustration for elucidating the geometrical relationships when using the angle measuring unit in accordance with FIGS. 8 and 9.

FIG. 10 shows the reconstruction of the three-dimensional image, that is to say of an image with depth information, of the measurement object 3 with the distance information items from the measurement beam generator 12.

During the recording of the image 17, the measurement beam forms an angle β in relation to the recording direction 8. The distance information item allocated to the image 17 is then assigned the impingement point $x_1$ of the measurement beam. f and $c_x$ are characteristic variables describing the optical imaging system of the recording device 16. It holds true that $\tan β = (x_1 - c_x)/f$.

With the motion vector 24, the angle measuring unit 5 then determines the impingement point $x_2$ of the measurement beam 27 in the recording position during the recording of the image 20, relative to the reference image 17.

In other words, in FIG. 10, the reference sign 27 designates the measurement beam in the reference system of the reference image 17. In this case, the length of the motion vector 24 determines the angle γ between the measurement beams and 27. It holds true that $\tan β = (x_2 - c_x)/f$ and $γ = α - β$.

It emerges that the measurement beam 27 forms an angle α with the recording direction 8 of the reference image 17.

Consequently, the distance information item of the image 20 can be assigned to the impingement point $x_2$.

After these method steps have been carried out, the angle measuring unit 5 creates a three-dimensional image of the measured points 10 of the measurement object 3 as a point cloud 36 in a three-dimensional space.

Figure 11:
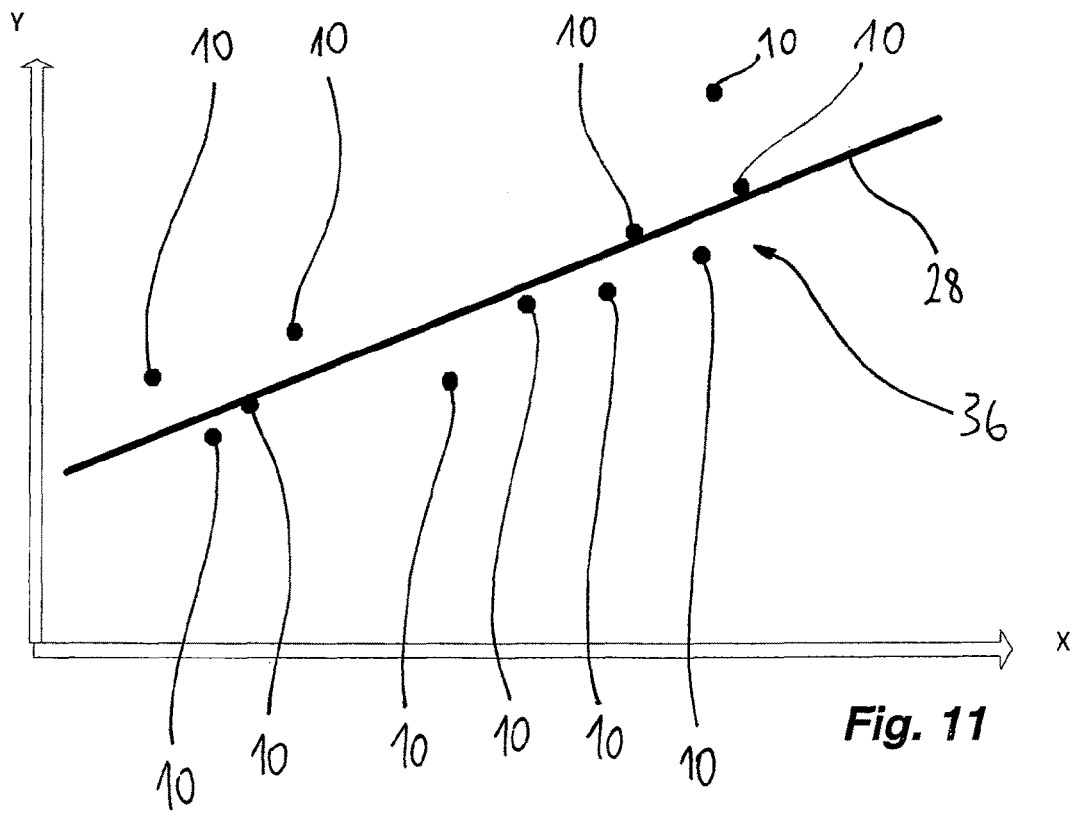
FIG. 11 shows a basic illustration of the calculation of a best-fit area when using the angle measuring unit in accordance with FIGS. 8 to 10.

FIG. 11 shows the result as a two-dimensional representation, in which the depth information was suppressed, for the sake of simplicity.

With an optimization algorithm, for example the least square minimization method, the angle measuring unit 5 places at least one best-fit area 28, illustrated here as a best-fit area, through the reconstructed points 10.

This best-fit area 28 describes a surface of the measurement object 3 to a very good approximation.

From the position of the best-fit area 28 in the three-dimensional space, the angle measuring unit 5 then determines the emission angle α analogously to FIGS. 5 and 6.

In exemplary embodiments of independent inventive quality, the method just described with regard to FIGS. 8 to 11 is used to create a three-dimensional image. A calculation of an emission angle 6 can be omitted here. By way of example, an actual surface area of a structure of the measurement object 3 can be calculated from the three-dimensional image.

By way of example, the measurement object 3 can be a house wall 29 having windows 30 and/or doors 31. By means of the described calculation of a three-dimensional image, the surface area of the windows 30, of the doors 31 and/or of the house wall can be determined automatically, for example in order to relate a radiation magnitude to the respectively emitting area. For this purpose, a plane can often be used as a best-fit area 28 since house walls 29, windows 30 and/or doors 31 are often implemented in a planar fashion.

Figure 12:
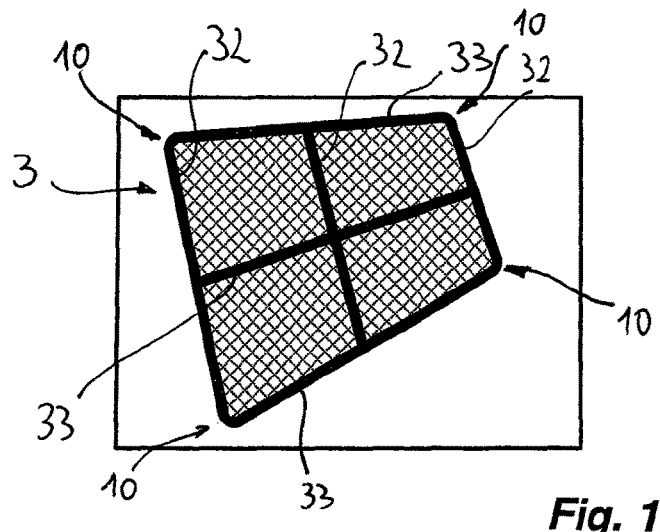
FIG. 12 shows a basic illustration of a recorded image of a measurement object for elucidating the functional principle of a further angle measuring unit according to the invention.
Figure 13:
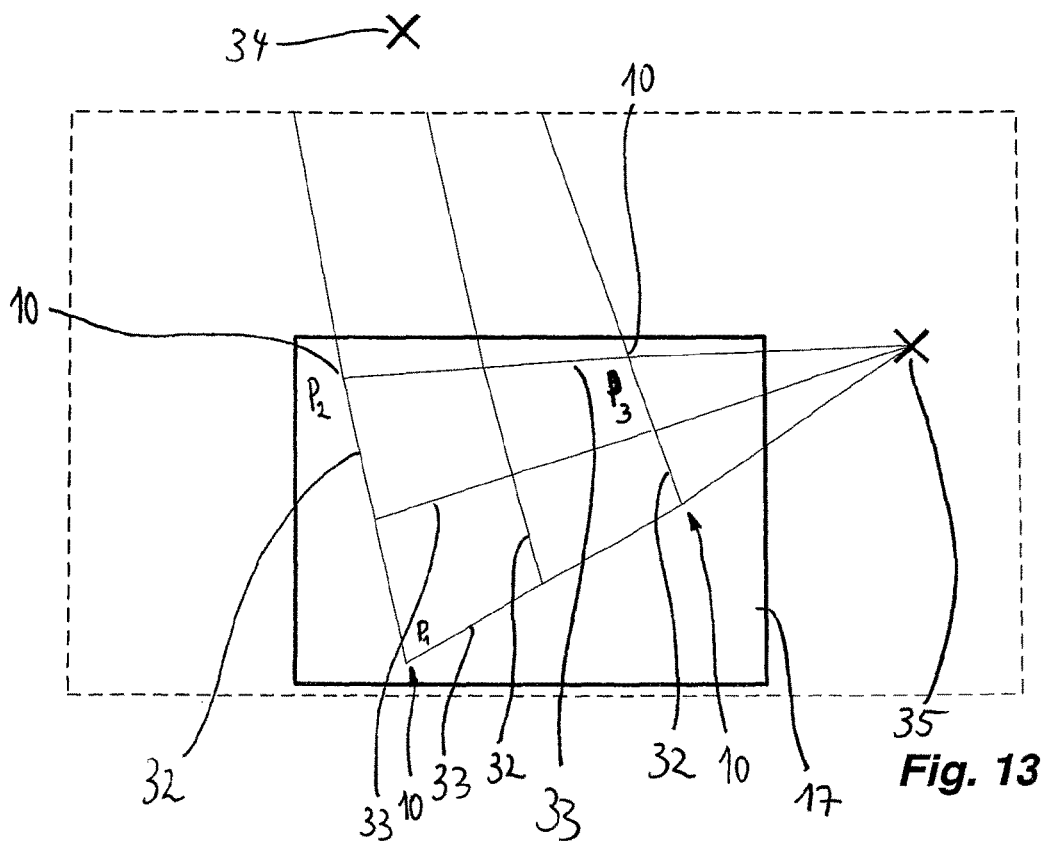
FIG. 13 shows a basic illustration of the calculation of vanishing points in a variant according to the invention of the determination of the emission angle.

FIGS. 12 and 13 show a further exemplary embodiment of a method according to the invention which can be performed with an angle measuring unit 5 of a device 1 according to the invention. Component parts implemented functionally or structurally identically or similarly to the previous exemplary embodiments are designated by the same reference signs and not described separately. The explanations above are thus correspondingly applicable here.

FIG. 12 shows a measurement object 3. The measurement object 3 has two groups of lines 32, 33 parallel to one another. As a result of the perspective illustration, the lines 32 appear to run toward a common vanishing point. Likewise, the lines 33 appear to run toward a vanishing point.

In a first step, the angle measuring unit 15 creates an image 17 from the measurement object 3. For this purpose, the angle measuring unit 15 has a recording device 16 implemented for recording in an infrared and/or visible spectral range. Recording devices that are sensitive in a further spectral range can also be used.

The recorded image 17 is shown schematically in FIG. 13.

By means of an image evaluation method, for example an edge detection, the lines 32, 33 in the image 17 are identified in a second step. The angle measuring unit 15 determines a vanishing point for each line pair of the lines 32, 33. As a result, the angle measuring unit 15 calculates two vanishing points 34, 35 for the example illustrated. Vanishing point 34 is described by the lines 32, and vanishing point 35 by the lines 33.

In a third step, the angle measuring unit 5 calculates for each vanishing point 34, 35, with the aid of a stored imaging geometry or in some other way, at what angle in relation to a recording direction 8 said vanishing point 34, 35 appears in the scene in which the measurement object 3 is situated. Subsequently or simultaneously, the angle measuring unit 5 determines, with the aid of the stored imaging geometry or in some other way, at what angle in relation to a recording direction 8 a selected point 10 on a line 32, 33, for example the point $P_1$, appears in the scene containing the measurement object 3. Since the selected line 32 or 33 runs parallel to the direction in which the associated vanishing point 34 or 35 lies, the angle formed by the direction in which the selected point 10 ($P_1$) lies and the direction of the vanishing point 32 or 33 is equal to the angle formed by the direction in which the selected point 10 ($P_1$) lies and the considered line 32 or 33.

By virtue of knowledge of the angle formed between the recording direction 8 and the direction in which the selected point 10 ($P_1$) lies, the emission angle 6 can thus be calculated with simple sums of internal angles. The angle measuring unit 5 thus calculates the sought emission angle 6, α.

In a further exemplary embodiment, a more precise determination of the emission angle 6 is performed using the method from Košecka, Jana; Zhang, Wie: Video Compass, European Conference on Computer Vision 2002, LNCS 2350, Springer Verlag, Springer: Berlin etc., 2006, pp. 476-491. The calculation steps presented therein are part of this exemplary embodiment.

In the exemplary embodiments described, the calculated emission angle is provided for further processing at the output unit 14.

In the case of the device 1 for non-contact temperature measurement, it is proposed to design an angle measuring unit 5 such that an emission angle 6 of the IR radiation detected by a detector 2 for temperature measurement can be measured on the measurement region 9 of a measurement object 3 which emits the IR radiation.

The invention claimed is:

1. A device (1) for non-contact temperature measurement, comprising a detector (2) for detecting IR radiation from a measurement object (3), an angle measuring unit (5) by which at least one emission angle (6) of the detected IR radiation is measureable on a measurement region (9) of the measurement object (3), the at least one the emission angle (6) is given by the angle between a surface normal (7) of the measurement region (9) on the measurement object (3) and a recording direction (8, 14) or an IR-optical axis of the device (1), and an evaluation unit (13) designed for correcting the IR measurement values by attenuation of the IR radiation detected by the device, said attenuation being governed by the at least one measured emission angle (6), wherein the angle measuring unit (5) is designed for calculating a distance information item (r1, r2, r3) assigned to a partial region (21) of a reference image (17) from the distance information item (r1, r2, r3) assigned to an image (20) of a recorded sequence (23) of images (17, 20) and from a calculated motion vector (24) describing a correlation between the image (20) and the reference image (17), or the angle measuring unit (5) is designed for at least approximately calculating a position of the measurement object (3) in a three dimensional space, said position being related to at least one of a recording position or the recording direction (8) of the device (1), from the distance information items (r1, r2, r3) assigned to the partial region (21) of the measurement object.

2. The device (1) as claimed in claim 1, wherein the device (1) is adapted to fill pixels of a pixel array defined by the detector (2) with IR measurement values.

3. The device (1) as claimed in claim 2, wherein for a plurality of groups of the pixels or a plurality of the pixels, the emission angle (6) between the surface normal (7) and the associated measurement region (9) on the measurement object (3) and the recording direction (8, 14) or the IR-optical axis of the device (1) or a line connecting the device (1) to the associated measurement region (9), is measureable by the angle measuring unit (5).

4. The device (1) as claimed in claim 1, wherein distances to at least two points (10) spaced apart from one another on the measurement object (3) are measureable by the angle measuring unit (5).

5. The device (1) as claimed in claim 1, wherein the angle measuring unit (5) is designed for distance measurement with at least one deflectable measurement beam or at least two measurement beams spaced apart from one another.

6. The device (1) as claimed in claim 1, wherein the angle measuring unit (5) has a recording device (16), which records in at least one of an infrared or visible spectral range and by which a geometrical shape (18) projected onto the measurement object (3) or described by the measurement object (3) is detectable, or the angle measuring unit (5) is designed for calculating a position of the measurement object (3) in a three-dimensional space, said position being related to at least one of a recording position or the recording direction (8) of the device (1) by comparing a recorded geometric shape (18) with an associated geometric comparison shape (19) stored in the angle measuring unit (5).

7. The device (1) as claimed in claim 1, wherein the angle measuring unit (5) is designed for recording a sequence (23) of images (17, 20) from the measurement object (3) in at least one of an infrared or visible spectral range and measuring a distance information item ($r_1$, $r_2$, $r_3$) respectively assigned to the images (17, 20), or the angle measuring unit (5) is designed for calculating at least one motion vector (24) which describes a correlation between two images (17, 20) of the recorded sequence (23) of images (17, 20).

8. The device (1) as claimed in claim 1, wherein the angle measuring unit (5) is designed for calculating the at least one of emission angle (6, α) from a position of the measurement object (3) in a three-dimensional space, said position being related to at least one of a recording position or the recording direction (8) of the device (1).

9. A device (1) for non-contact temperature measurement, comprising a detector (2) for detecting IR radiation from a measurement object (3), an angle measuring unit (5) by which at least one emission angle (6) of the detected IR radiation is measureable on a measurement region (9) of the measurement object (3), the at least one the emission angle (6) is given by the angle between a surface normal (7) of the measurement region (9) on the measurement object (3) and a recording direction (8, 14) or an IR-optical axis of the device (1), and an evaluation unit (13) designed for correcting the IR measurement values by attenuation of the IR radiation detected by the device, said attenuation being governed by the at least one measured emission angle (6), wherein the angle measuring unit (5) is designed for identifying lines (32, 33) running parallel on the measurement object (3) in an image (17, 20) recorded from the measurement object (3) in at least one of an infrared or visible spectral range, or the angle measuring unit (5) is designed for calculating the at least one emission angle (6, α) from a position of at least one vanishing point (34, 35) in the image (17, 20) recorded in the at least one of the infrared or visible spectral range.

10. The device (1) as claimed in claim 1, wherein the evaluation unit (13) designed for generating a warning signal if the at least one of emission angle (6) measured by the angle measuring unit (5) lies outside a predefined range.

11. The device (1) as claimed in claim 1, wherein the evaluation unit (13) is designed for correcting the IR measurement values by the attenuation of the IR radiation detected by the device, said attenuation being governed by the at least one measured emission angle (6) being applied to Lambert's cosine law for radiant intensity.

12. The device (1) as claimed in claim 1, further comprising an output unit (14, 15) designed for outputting corrected IR measurement values.

13. A temperature measurement method, comprising
detecting IR radiation from a measurement object (3) by a detector (2) of a device (1) for non-contact temperature measurement,
measuring an emission angle (6) of the detected IR radiation on a measurement region (9) of the measurement object (3) by an angle measuring unit (5) of the device (1),
measuring an angle between a surface (7) of a measurement region (9) on the measurement object (3) and a recording direction (8, 14) or an IR-optical axis of the device (1), for the purpose of measuring the emission angle (6), and using an evaluation unit (13),
correcting at least one IR measurement value by attenuation of the IR radiation detected by the detector (2), said attenuation being governed by the at least one measured emission angle (6), and
automatically calculating a distance information item (r1, r2, r3) assigned to a partial region (21) of a reference image (17) from the distance information item (r1, r2, r3) assigned to an image (20) of a recorded sequence (23) of images (17, 20) and from a calculated motion vector (24) describing a correspondence in terms of contents between the image (20) and the reference image (17), or at least approximately calculating automatically a position of the measurement object (3) in a three dimensional space, said position being related to at least one of a recording position or the recording direction (8) of the device (1), from distance information items (r1, r2, r3) assigned to the partial region (21) of the measurement object (3).

14. The temperature measurement method as claimed in claim 13, wherein a pixel array defined by the detector (2) has pixels, and the method further comprises filling the pixel array with pixels representing the IR measurement values of the IR radiation.

15. The temperature measurement method as claimed in claim 14, wherein for a plurality of groups of the pixels or a plurality of the pixels, the at least one emission angle (6), is measured in each case by the angle measuring unit (5).

16. The temperature measurement method as claimed in claim 15, wherein distances to at least two points (10) spaced apart from one another on the measurement object (3) are measured by the angle measuring unit (5).

17. The temperature measurement method as claimed in claim 13, wherein at least two distance measurements with respect to the measurement object (3) are carried out with one deflectable measurement beam, or in each case one distance measurement with respect to the measurement object (3) is carried out with at least two measurement beams spaced apart from one another.

18. The temperature measurement method as claimed in claim 13, further comprising generating a warning signal by an evaluation unit (13) of the device (1) if the at least one emission angle (6) measured by the angle measuring unit (5) leaves a predefined range.

19. The temperature measurement method as claimed in claim 13, wherein a geometrical shape (18) projected onto the measurement object (3) or described by the measurement object (3) is detected, or a position of the measurement object (3) in a three-dimensional space, said position being related to at least one of a recording position or the recording direction (8) of the device (1), is calculated automatically by comparison of a recorded geometrical shape (18) with an associated geometrical comparison shape (19) stored in the angle measuring unit (5).

20. The temperature measurement method as claimed in claim 13, further comprising recording a sequence (23) of images (17, 20) from the measurement object (3) in at least one of an infrared or visible spectral range and a distance information item ($r_1$, $r_2$, $r_3$) respectively assigned to the images (17, 20), is measured, or at least one motion vector (24) which describes a correspondence in terms of contents between two images (17, 20) of a recorded sequence (23) of images (17, 20) is calculated automatically.

21. The temperature measurement method as claimed in claim 13, wherein the at least one emission angle (6) is calculated automatically from a position of the measurement object (3) in a three-dimensional space, said position being related to at least one of a recording position or the recording direction (8) of the device (1).

22. The temperature measurement method as claimed in claim 13, further comprising using the evaluation unit (13) to correct at least one IR measurement value by the radiation-physical attenuation of the IR radiation detected by the detector (2), said attenuation being governed by the at least one measured emission angle (6) being applied to Lambert's cosine law for the radiant intensity being taken into account.

23. The temperature measurement method as claimed in claim 13, further comprising outputting a corrected thermal image with corrected IR measurement values or a corrected temperature value.

24. A temperature measurement method, comprising:
detecting IR radiation from a measurement object (3) by a detector (2) of a device (1) for non contact temperature measurement,
measuring an emission angle (6) of the detected IR radiation on a measurement region (9) of the measurement object (3) by an angle measuring unit (5) of the device (1),
measuring an angle between a surface (7) of a measurement region (9) on the measurement object (3) and a recording direction (8, 14) or an IR optical axis of the device (1), for the purpose of measuring the emission angle (6), and using an evaluation unit (13), correcting at least one IR measurement value by a radiation physical attenuation of the IR radiation detected by the detector (2), said attenuation being governed by the at least one measured emission angle (6), wherein lines (32, 33) running parallel on the measurement object (3) are identified automatically in an image (17, 20) recorded from the measurement object (3) in at least one of an infrared or visible spectral range, or the emission angle (6) is calculated automatically from a position of at least one vanishing point (34, 35) in an image (17, 20) recorded in at least one of the infrared or visible spectral range.

* * * * *